US006509867B1

(12) United States Patent
McGibney

(10) Patent No.: US 6,509,867 B1
(45) Date of Patent: Jan. 21, 2003

(54) ARTICLE TRACKING DEVICE

(75) Inventor: James A. McGibney, San Francisco, CA (US)

(73) Assignee: SecuraTrak, Inc., San Francisco, CA (US)

( * ) Notice: Subject to any disclaimer, the term of this patent is extended or adjusted under 35 U.S.C. 154(b) by 0 days.

(21) Appl. No.: 09/668,984

(22) Filed: Sep. 25, 2000

Related U.S. Application Data

(60) Provisional application No. 60/202,477, filed on May 8, 2000.

(51) Int. Cl.[7] .......................... G08B 13/14; G01C 21/00

(52) U.S. Cl. .............................. 342/357.07; 340/568.1; 701/213

(58) Field of Search ..................... 701/213; 342/357.07, 342/357.09, 357.1; 340/568.1, 572.7, 572.8, 573.1, 573.4; 455/575, 456, 457

(56) References Cited

U.S. PATENT DOCUMENTS

| | | | | | |
|---|---|---|---|---|---|
| 5,742,233 | A | * | 4/1998 | Hoffman et al. | 340/573 |
| 5,748,084 | A | * | 5/1998 | Isikoff | 340/568 |
| 5,835,377 | A | * | 11/1998 | Bush | 364/468.05 |
| 5,877,724 | A | * | 3/1999 | Davis | 342/357 |
| 6,014,080 | A | * | 1/2000 | Layson, Jr. | 340/573.1 |
| 6,067,018 | A | * | 5/2000 | Skelton et al. | 340/573.3 |
| 6,100,806 | A | * | 8/2000 | Gaukel | 340/573.4 |
| 6,121,922 | A | * | 9/2000 | Mohan | 342/357.1 |
| 6,140,956 | A | * | 10/2000 | Hillman et al. | 342/357.07 |
| 6,243,039 | B1 | * | 6/2001 | Elliot | 342/457 |
| 6,362,736 | B1 | * | 3/2002 | Gehlot | 340/539 |

FOREIGN PATENT DOCUMENTS

GB 2270405 A * 3/1994

* cited by examiner

*Primary Examiner*—Michael J. Zanelli
(74) *Attorney, Agent, or Firm*—Fenwick & West LLP

(57) ABSTRACT

An improved article tracking and locating system comprising a global positioning satellite receiver built into a peripheral component interconnect board, together with means for transmitting analog and digital signals over the cellular control channel to a central location where the desired information can be made available immediately over the Internet to appropriate persons.

17 Claims, 2 Drawing Sheets

ARTICLE TRACKING DEVICE

This application claims the benefit under 35 U.S.C. § 119(e) of U.S. Provisional Application No. 60/202,477, filed May 8, 2000, and entitled "Tracking Device Which Implements GPS, Cellular and RF Signals on One Module", which is hereby incorporated by reference herein.

FIELD OF INVENTION

This invention relates to article tracking devices and is particularly directed to improved article tracking devices which combine a global positional satellite receiver and cellular control channel analog or digital signalling means in a computer chip which can be attached to a desired article, such as a laptop or desktop computer, server, person, animal, vehicle or the like to automatically signal the location of the protected article to a central location where the information can be made available over the internet for appropriate parties.

PRIOR ART

Articles are frequently lost, misplaced, stolen and the owners are thus deprived of the benefit of such articles. Unfortunately, most articles are difficult or impossible to track or locate, once they have been removed from their proper location. Consequently the ability to locate and track such articles has been of considerable interest for many years. With the advent of radio, computers and microtechnology, numerous types of tracking and locating devices have been proposed. However, most of the prior art tracking and locating devices have been bulky and cumbersome and could not conveniently be hidden in or inconspicuously attached to an article to be protected. Also, most prior art article tracking and locating devices have relied upon low power or microwave radio technology and, hence, have had very limited range. In addition, most prior art article tracking and locating devices have relied only upon a single energy source for energization and, therefore, have been heavy or have had short useful lives.

BRIEF SUMMARY AND OBJECTS OF INVENTION

These disadvantages of the prior art are overcome with the present invention and an improved article tracking and locating device is provided which is inexpensive to manufacture and sell, is compact in size and weight and, hence, can conveniently be hidden in or inconspicuously attached to an article to be protected and which provides worldwide tracking and locating ability together with the ability to make the necessary information available virtually instantly to appropriate parties anywhere in the world.

These advantages of the present invention are preferably attained by providing an improved article tracking and locating system comprising a global positioning satellite receiver built into a peripheral component interconnect board, together with means for transmitting analog and digital signals over the cellular control channel to a central location where the desired information can be made available immediately over the internet to appropriate persons.

Accordingly, it is an object of the present invention an improved article tracking and locating device.

Another object of the present invention is to provide an improved article tracking and locating device which is inexpensive to manufacture and sell.

An additional object of the present invention is to provide an improved article tracking and locating device which is minuscule in size and weight and, hence, can conveniently be hidden in or inconspicuously attached to an article to be protected.

A further object of the present invention is to provide an improved article tracking and locating device which provides worldwide tracking and locating ability.

Another object of the present invention is to provide an improved article tracking and locating device which provides worldwide tracking and locating ability together with the ability to make the necessary information available virtually instantly to appropriate parties anywhere in the world.

A specific object of the present invention is to provide an improved article tracking and locating system comprising a global positioning satellite receiver built into a peripheral component interconnect board, together with means for transmitting analog and digital signals over the cellular control channel to a central location where the desired information can be made available immediately over the internet to appropriate persons.

These and other objects and features of the present invention will be apparent from the following detailed description, taken with reference to the figures of the accompanying drawing.

DETAILED DESCRIPTION OF THE INVENTION

Figure 1:
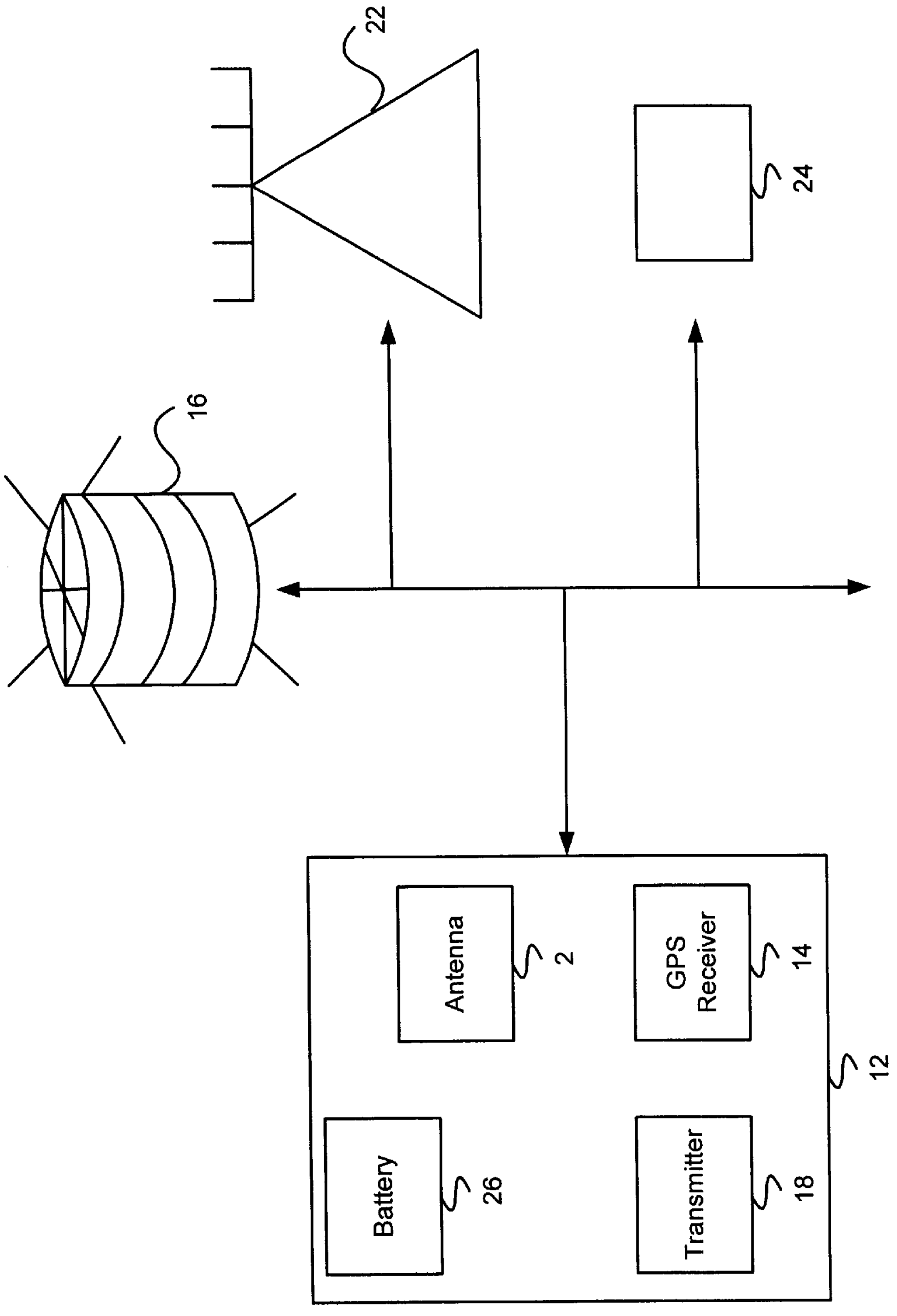
FIG. 1 is a diagrammatic representation showing the article tracking and locating device of the present invention.
Figure 2:
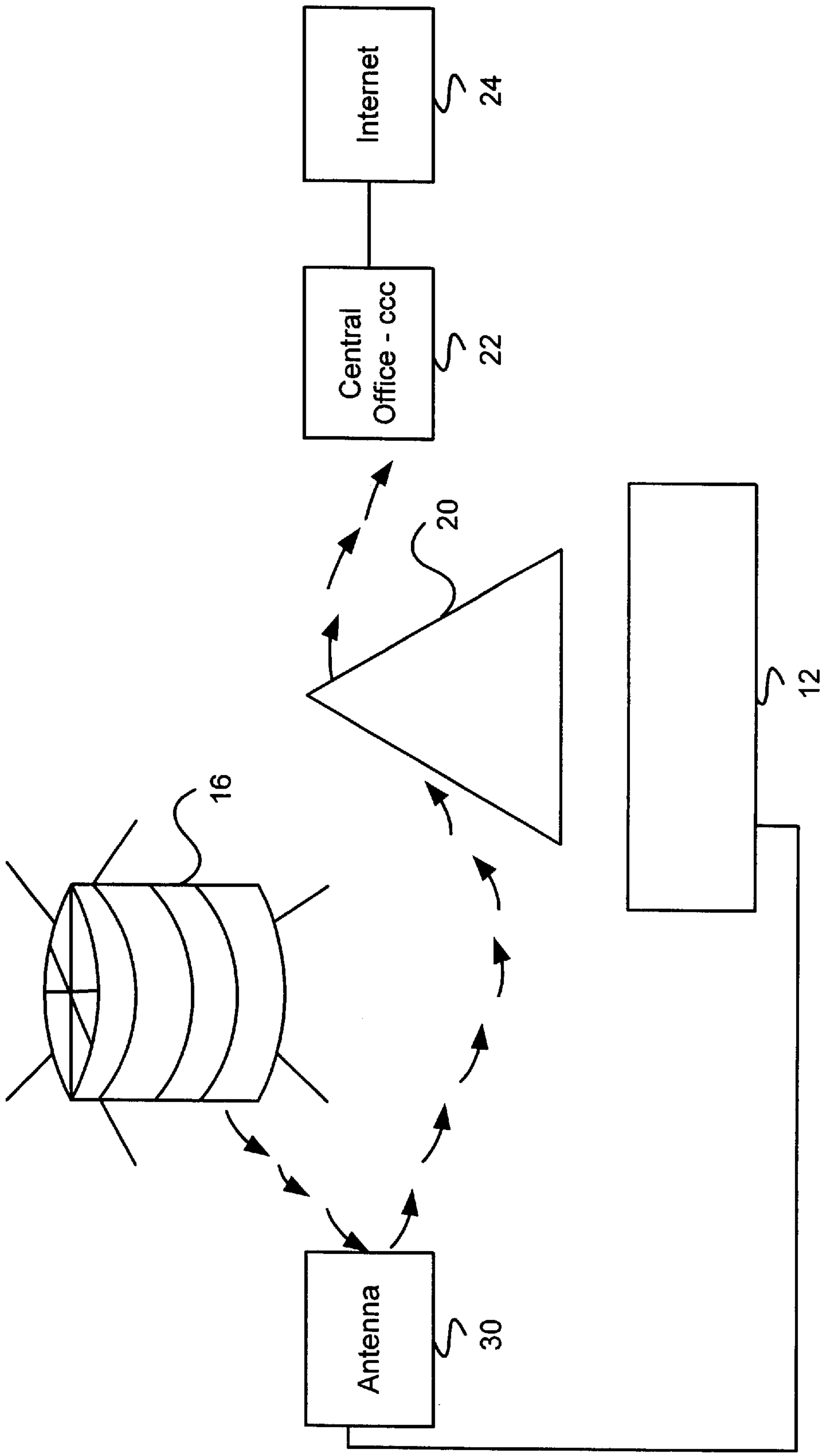
FIG. 2 is a diagrammatic representation showing the device of FIG. 1 using an external antenna.

In that form of the present invention chosen for purposes of illustration, FIG. 1 shows a peripheral component interconnect board (PCI), indicated generally at 12 having a receiver 14 constructed on the board 12 to receive signals from a global positioning satellite (GPS), as indicated at 16, together with a transmitter 18 for transmitting analog or digital over the cellular control channel (CCC), signals, as seen at 20 (as shown in FIG. 2), to a central location 22 which interprets the signals and displays the information on the Internet, as indicated at 24, for appropriate parties. The PCI board 12 is normally about 6 inches square, but can be made even smaller as miniaturization techniques improve. The board 12 is designed to receive electrical power from a computer through a conventional PCI board connection. However, if desired, a rechargeable solar battery 26 may be provided on the board 12 to energize the receiver 14 and transmitter 18. Also, if desired, a pigtail may be provided to allow the receiver 14 and transmitter 18 to be energized from a suitable external source, not shown. Ideally, the antennas 2 for the GPS and CCC will be built into the board 12. However, if necessary or desirable, external antennas 30 may be provided through appropriate connections, as seen in FIG. 2.

In use, the board 12 can be mounted on, embedded in or attached to an article to be protected. Thus, for example, the board 12 can be mounted on a gun stock, the chassis of a vehicle or other article to be protected to enable the protected article to be tracked and located. Similarly, the board 12 could be mounted on a belt, animal collar or the like to provide tracking and locating capabilities for persons or animals. By receiving GPS signals, the board 12 can determine the location of the protected article anywhere in the world and can use the CCC to transmit this information, together with an individual identifying signal, to the central location 22 which can interpret the signals from the board 12 and can display the information on the Internet 24 where it can be accessed by the appropriate parties. Most personal computers have expansion slots for PCI cards which have contacts for supplying electrical energy from the computer's power system to the PCI card. Where this is true, the device of the present invention can use that power to energize the receiver 14 and transmitter 18. Alternatively, the board 12 can use the on-board battery 26 for energizing the receiver 14 and transmitter 18. Obviously, if the board 12 is inserted in an expansion slot of the computer, it will not be visible and, if someone moves the computer from its proper location, the board 12 will sense this and will send an appropriate signal through the CCC system to the central location 22. Because of the small size of the board 12, it can easily be hidden in or about an article to be protected or can be mounted on a belt, collar or the like for tracking and locating persons or animals. The device of the present invention can also take on the form factor of PCMCIA, ISA or stand-alone.

Obviously, numerous variations and modifications can be made without departing from the spirit of the present invention, therefore, it should be cleasly understood that the forms of the present invention described above and shown in the figures of the accompanying drawing are illustrative only and are not intended to limit the scope of the present invention.

What is claimed is:

1. An article tracking and locating device comprising:

a substrate;

a global positioning system receiver mounted on the substrate, the receiver for receiving first signals enabling the receiver to determine a position of the device;

a transmitter mounted on the substrate, the transmitter for transmitting second signals indicating the position of the device; and a power interface mounted on the substrate and adapted to receive power from a plurality of power sources.

2. The device of claim 1, further comprising:

means at a central location for receiving the second signals from the transmitter; and means at the central location for providing information derived from the second signals over an Internet web interface.

3. The device of claim 2, wherein the information is provided on the Internet in a secure manner.

4. The device of claim 1, wherein the plurality of power sources includes a battery recharged by solar power.

5. The device of claim 1, further comprising:

one or more antennas mounted on the substrate for receiving the first signals and sending the second signals.

6. The device of claim 1, wherein the plurality of power sources includes a rechargeable battery.

7. The device of claim 1, wherein the substrate is a peripheral component interconnect board.

8. The device of claim 7, wherein the interconnect board is adapted to be inserted in an expansion slot of a computer system.

9. The device of claim 1, wherein the substrate is attached to an article worn by an individual to be tracked.

10. A device for tracking and locating a computer system, the device comprising:

a peripheral board adapted to be inserted in an expansion slot of the computer system, the peripheral board comprising:

a global positioning system receiver for receiving first signals enabling the receiver to determine a position of the device;

a transmitter for transmitting second signals indicating the position of the device; and a power interface adapted to simultaneously receive power from a plurality of power sources.

11. The device of claim 10, further comprising:

means at a central location for receiving the second signals from the transmitter; and means at the central location for providing information derived from the second signals over an Internet web interface.

12. The device of claim 11, wherein the information is provided on the Internet in a secure manner.

13. The device of claim 10, wherein the plurality of power sources includes a battery recharged by solar power.

14. The device of claim 10, wherein the plurality of power sources includes a rechargeable battery.

15. The device of claim 10, wherein the peripheral board further comprises one or more antennas for receiving the first signals and sending the second signals.

16. The device of claim 10, wherein the computer system is a rack-mounted computer system.

17. The device of claim 10, wherein the computer system is a desktop computer system.

* * * * *